(12) United States Patent
Harada et al.

(10) Patent No.: US 11,677,092 B2
(45) Date of Patent: Jun. 13, 2023

(54) ASSEMBLY METHOD USING ASSEMBLY TOOL

(71) Applicant: HONDA MOTOR CO., LTD., Tokyo (JP)

(72) Inventors: Ken Harada, Tochigi (JP); Yo Shimomura, Tochigi (JP); Naoki Ishihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 17/210,526

(22) Filed: Mar. 24, 2021

(65) Prior Publication Data
US 2021/0305593 A1 Sep. 30, 2021

(30) Foreign Application Priority Data
Mar. 27, 2020 (JP) .............................. JP2020-058117

(51) Int. Cl.
| *H01M 8/2404* | (2016.01) |
| *H01M 8/2475* | (2016.01) |
| *B25B 11/02* | (2006.01) |
| *H01M 8/04082* | (2016.01) |

(52) U.S. Cl.
CPC ....... *H01M 8/2404* (2016.02); *H01M 8/2475* (2013.01)

(58) Field of Classification Search
CPC . F16L 37/56; F16L 37/367; Y10T 137/87941; H01M 8/04201; H01M 8/04089; H01M 8/04208; H01M 8/2484; B23P 19/002; B23P 19/02; B23P 19/04; B23P 21/002; H01L 21/67
See application file for complete search history.

(56) References Cited

U.S. PATENT DOCUMENTS

| 2,399,525 | A | * | 4/1946 | Waag | ...................... | F16L 37/56 |
| | | | | | | 137/595 |
| 3,331,704 | A | * | 7/1967 | Vickers | ................... | H01M 8/00 |
| | | | | | | 429/458 |
| 6,634,864 | B1 | * | 10/2003 | Young | ..................... | F04B 17/00 |
| | | | | | | 417/208 |
| 2008/0131738 | A1 | * | 6/2008 | Eickhoff | ........... | H01M 8/04089 |
| | | | | | | 429/444 |

FOREIGN PATENT DOCUMENTS

| CN | 106695627 A | | 5/2017 | | |
| CN | 209843759 U | | 12/2019 | | |
| GB | 2525697 A | * | 11/2015 | .......... | H01M 8/0267 |
| JP | 2011003348 A | | 1/2011 | | |

* cited by examiner

*Primary Examiner* — Ula C Ruddock
*Assistant Examiner* — Amanda Rosenbaum
(74) *Attorney, Agent, or Firm* — CKC & Partners Co., LLC

(57) ABSTRACT

Provided is an assembly method using an assembly tool used when a component is assembled to each of a plurality of connection ports to provided at an upper surface of a fuel-cell stack and communicating with a plurality of communication holes. The assembly tool includes a base portion positioned on the upper surface of the fuel-cell stack and a plurality of covering portions covering the plurality of connection ports. Each of the plurality of covering portions is, relative to the base portion, provided movably between a covering position for covering a corresponding one of the connection ports and a non-covering position accessible to a corresponding one of the connection ports.

8 Claims, 3 Drawing Sheets

ASSEMBLY METHOD USING ASSEMBLY TOOL

This application is based on and claims the benefit of priority from Japanese Patent Application No. 2020-058117, filed on 27 Mar. 2020, the content of which is incorporated herein by reference.

BACKGROUND OF THE INVENTION

Field of the Invention

The present invention relates to an assembly method using an assembly tool.

Related Art

Typically, one configured such that a plurality of holes communicating with an opening and opening to the outside is formed at an end plate of a fuel cell arranged at at least one end portion in a stacking direction and can be closed with a plug member has been disclosed (see, e.g., Japanese Unexamined Patent. Application, Publication No. 2011-3348).

The holes described herein function as connection ports for various components, and various components are assembled to these holes. Assembly of the component to each connection port is sequentially performed for each connection port.

Patent Document 1: Japanese Unexamined Patent Application, Publication No. 2011-3348

SUMMARY OF THE INVENTION

However, during a component assembly process, the other connection ports not targeted for the process are in an open state, and for this reason, there is a probability that the component may drop into these connection ports or contaminate these connection ports. Each connection port communicates with a communication hole as a flow path of the fuel cell, and therefore, important issues of components dropping into the connection ports and contaminating these connection ports need to be avoided.

The present invention has been made in view of the above-described problems, and an object of the present invention is to provide an assembly method using an assembly tool, the assembly method being configured so that when an operator assembles a component to a connection port of a fuel-cell stack, the component can be prevented from dropping into other connection ports and contaminating these connection ports.

(1) An aspect of the present invention relates to an assembly method using an assembly tool (e.g., a later-described assembly tool 2) used when a component is assembled to each of a plurality of connection ports (e.g., later-described connection ports 11 to 16) provided at an upper surface of a fuel-cell stack (e.g., a later-described fuel-cell stack 1) and communicating with a plurality of communication holes, and the assembly tool includes a base portion (e.g., a later-described base portion 21) positioned on the upper surface of the fuel-cell stack and a plurality of covering portions (e.g., later-described covering portions 22 to 27) each covering the plurality of connection ports. Each of the plurality of covering portions is, relative to the base portion, provided movably between a covering position for covering the connection port and a non-covering position accessible to the connection port.

In the assembly method using the assembly tool according to (1), the plurality of covering portions of the assembly tool including the base portion positioned on the upper surface of the fuel-cell stack and the plurality of covering portions covering the plurality of connection ports is, relative to the base portion, selectively moved between the covering position for covering the connection port and the non-covering position accessible to the connection port. That is, when an operator assembles a component to the connection port of the fuel-cell stack, only the covering portion covering the connection port targeted for assembly is moved to the non-covering position. With this configuration, the covering portions covering the other connection ports not targeted for assembly are held at the covering positions, and therefore, the component can be reliably prevented from dropping into the other connection ports not targeted for assembly and contaminating these connection ports.

(2) The component assembly method using the assembly tool according to (1) is provided, the method including the step of positioning the base portion on the upper surface of the fuel-cell stack, the step of moving at least one of the plurality of covering portions to the non-covering position and holding the remaining covering portions at the covering positions, and the step of assembling the component to the connection port that becomes accessible by movement to the non-covering position.

In the assembly method according to (2), the step of positioning the base portion on the upper surface of the fuel-cell stack, the step of moving at least one of the plurality of covering portions to the non-covering position and holding the remaining covering portions at the covering positions, and the step of assembling the component to the connection port that becomes accessible by movement to the non-covering position are provided. With this configuration, advantageous effects similar to those of the aspect (1) of the invention are achieved.

(3) The assembly method according to (2) may further include the step of spraying out purge gas from the connection port to which the component is to be assembled.

In the assembly method according to (3), the step of spraying out the purge gas from the connection port to which the component is to be assembled is provided. With this configuration, the purge gas is sprayed out from the connection port targeted for assembly when the component is assembled to such a connection port, and therefore, the possibility of the component dropping into the connection port targeted for assembly and contaminating such a connection port can also be reduced.

According to the present invention, the assembly method using the assembly tool can be provided, the assembly method being configured so that when the operator assembles a component to the connection port of the fuel-cell stack, the component can be prevented from dropping into the other connection ports and contaminating these connection ports.

DETAILED DESCRIPTION OF THE INVENTION

Figure 1:
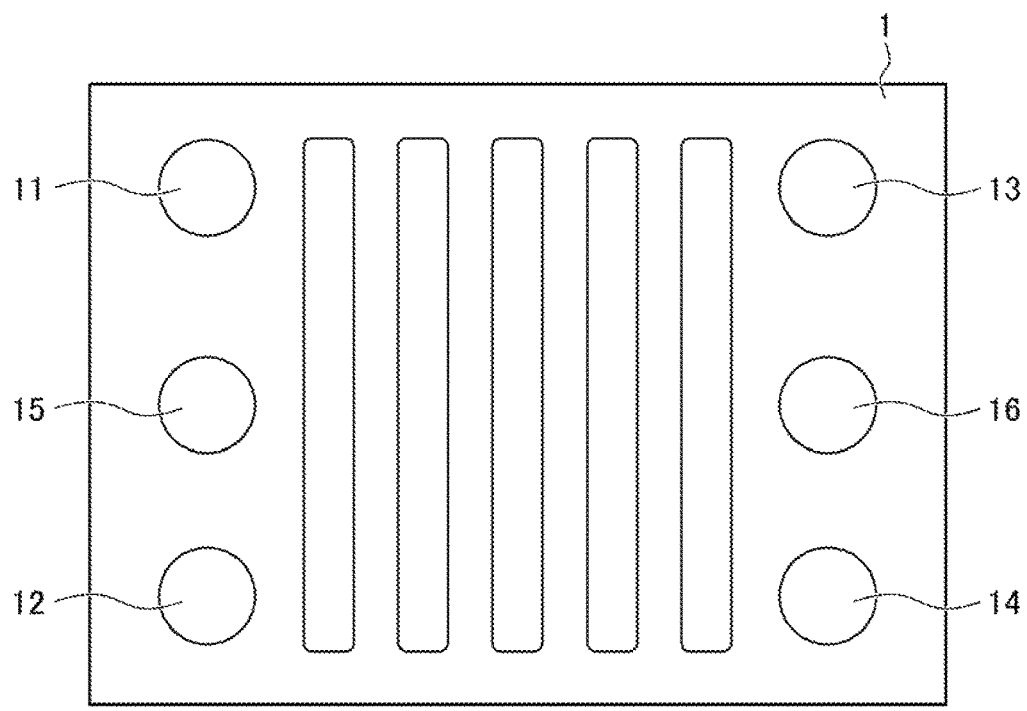
FIG. 1 is a plan view of a fuel-cell stack.

FIG. 1 is a plan view of a fuel-cell stack. An assembly tool according to one embodiment of the present invention is used when various components such as joints of reaction gas pipes or coolant water pipes are each assembled to a plurality of connection ports 11 to 16 provided at an upper surface of a fuel-cell stack 1 and communicating with a plurality of communication holes.

As shown in FIG. 1, the connection ports 11 to 16 communicating with the plurality of communication holes are formed at the upper surface of the fuel-cell stack 1. Any of the connection ports 11 to 14 through which reaction gas (hydrogen $H_2$, oxygen $O_2$) flows in or out is arranged at a corresponding one of four corners of the fuel-cell stack 1, and is provided to open upwardly. Any of these connection ports 11 to 14 communicates with a corresponding one of reaction gas flow paths formed in the fuel-cell stack 1.

Each of the connection ports 15, 16 through which coolant water flows in or out is arranged between corresponding ones of the connection ports 11 to 14 through which the above-described reaction gas flows in or out, and is provided to open upwardly. These connection ports 15, 16 each communicate with coolant water flow paths formed in the fuel-cell stack 1.

Figure 2:
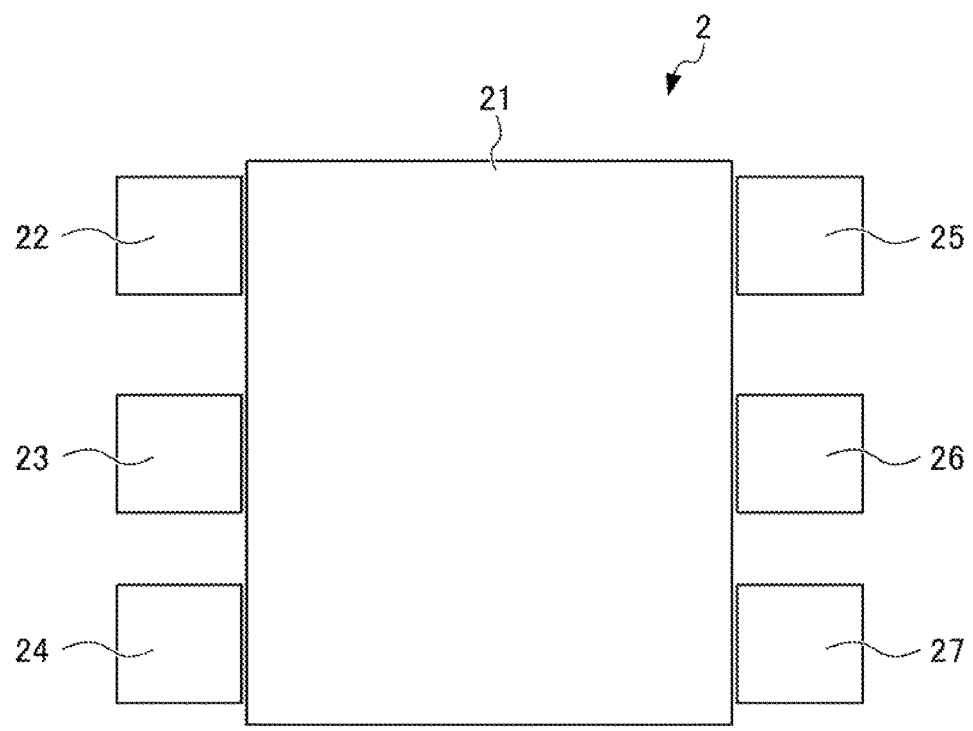
FIG. 2 is a plan view of an assembly tool according to one embodiment of the present invention.

FIG. 2 is a plan view of an assembly tool 2 according to one embodiment of the present invention. As shown in FIG. 2, the assembly tool 2 includes a base portion 21 and covering portions 22 to 27. The base portion 21 and the covering portions 22 to 27 include plate-shaped members. Moreover, the base portion 21 and the covering portions 22 to 27 include, for example, transparent members so that an operator can visually recognize the fuel-cell stack 1 in a case where the base portion 21 and the covering portions 22 to 27 are mounted and positioned on the upper surface of the fuel-cell stack 1 as described later.

The base portion 21 includes a rectangular plate member, and is arranged at the center of the assembly tool 2. The base portion 21 covers a center portion of the upper surface of the fuel-cell stack 1 when the base portion 21 is positioned on the upper surface of the fuel-cell stack 1. A raised shape corresponding to a recessed shape formed at the center portion of the upper surface of the fuel-cell stack 1 is formed at a lower surface of the base portion 21.

The covering portions 22 to 27 are arranged, three by three, on the opposing sides of the base portion 21, and any of these portions includes a rectangular plate member. These covering portions 22 to 27 are set to such a size that the covering portions 22 to 27 can each cover the plurality of connection ports 11 to 16. These covering portions 22 to 27 each cover the plurality of connection ports 11 to 16 when the covering portions 22 to 27 are positioned on the upper surface of the fuel-cell stack 1.

The covering portions 22 to 27 are set such that a clearance with a corresponding one of the connection ports 11 to 16 is equal to or less than an allowable contaminant size in a case where the raised shape of the base portion 21 is fitted and positioned in the recessed shape of the upper surface of the fuel-cell stack 1. With this configuration, contamination through the clearance among the covering portions 22 to 27 and the connection ports 11 to 16 due to, e.g., fine dust is avoided.

The covering portions 22 to 27 are configured such that a plurality of microholes is formed at portions corresponding to the positions of the connection ports 11 to 16 in a case where the raised shape of the base portion 21 is fitted and positioned in the recessed shape of the upper surface of the fuel-cell stack 1. The size of each of the plurality of microholes is set to equal to or less than the allowable contaminant size. With this configuration, scavenged purge gas can be discharged in a case where a later-described configuration for spraying out purge gas is employed.

Any of these covering portions 22 to 27 is, relative to the base portion 21, configured movably between a covering position for covering the connection port and a non-covering position accessible to the connection port. Examples of a movement mechanism include a movement mechanism provided on an upper surface of the base portion 21 and including a guide rail (not shown) extending in a right-left direction as viewed in FIG. 2 and a cylinder mechanism (not shown) as a drive source that moves each of the covering portions 22 to 27 along the guide rail.

With the above-described movement mechanism, the covering portions 22 to 24 are provided to be freely movable in a right direction as viewed in FIG. 2 relative to the connection ports 11, 15, 12 along the guide rail, and freely cover or partially open upper surfaces of the connection ports 11, 15, 12. Similarly, the covering portions 25 to 27 are provided to be freely movable in a left direction as viewed in FIG. 2 relative to the connection ports 13, 16, 14 along the guide rail, and freely cover or partially open upper surfaces of the connection ports 13, 16, 14.

Figure 3:
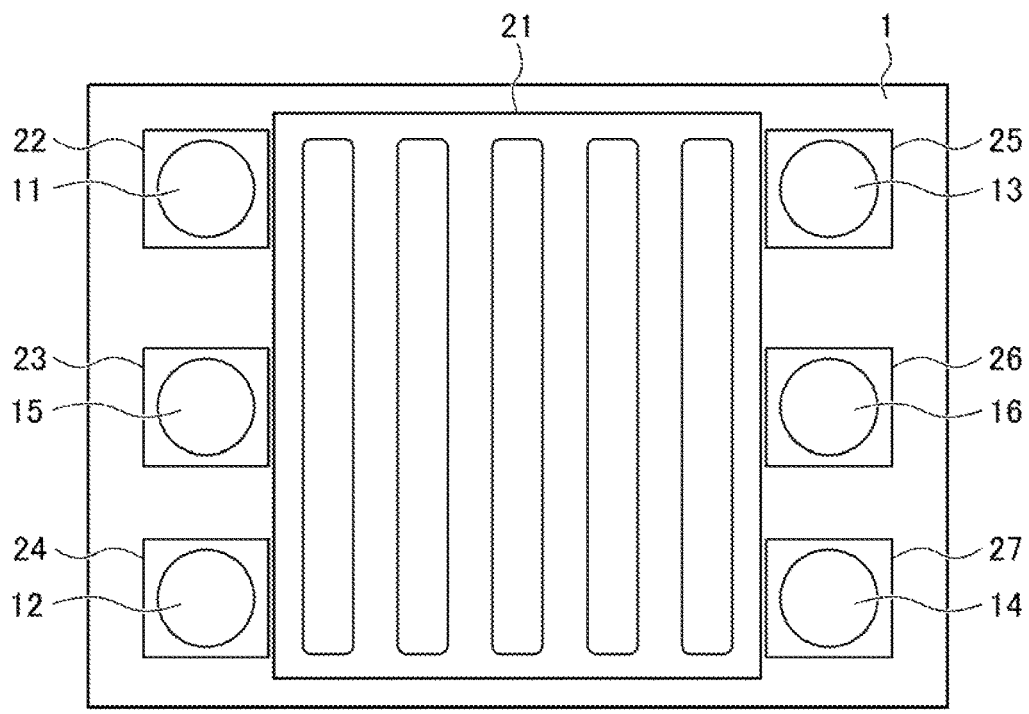
FIG. 3 is a view showing a state in which the assembly tool according to one embodiment of the present invention is positioned on an upper surface of the fuel-cell stack.

Next, an assembly method using the assembly tool 2 according to the present embodiment will be described. FIG. 3 is a view showing a state in which the assembly tool 2 according to one embodiment of the present invention is positioned on the upper surface of the fuel-cell stack 1. Specifically, the assembly tool 2 is positioned after the raised shape formed at the lower surface of the base portion 21 of the tool 2 has been fitted in the recessed shape of the upper surface of the fuel-cell stack 1. The state shown in FIG. 3 is before the start of an assembly process, and therefore, the covering portions 22 to 24 are at positions for covering the upper surfaces of the connection ports 11, 15, 12. Similarly, the covering portions 25 to 27 are at positions for covering the upper surfaces of the connection ports 13, 16, 14. The assembly tool 2 may be positioned in such a manner that the assembly tool 2 is fixed to the upper surface of the fuel-cell stack 1 with a stud, for example.

Figure 4:
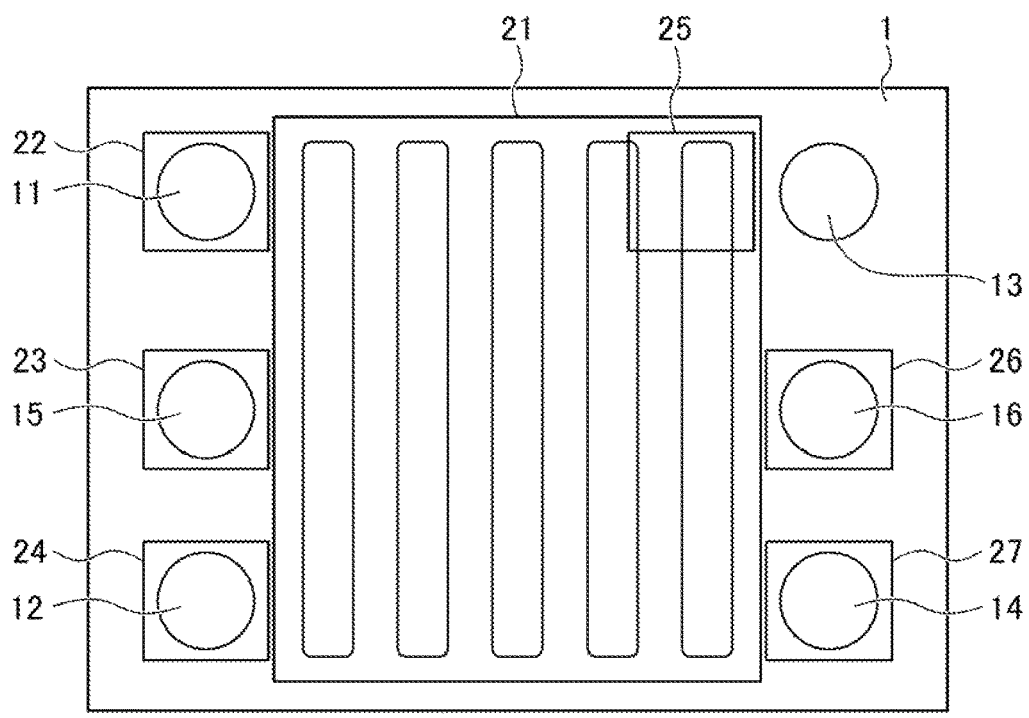
FIG. 4 is a view showing a state in which a covering portion of the assembly tool according to one embodiment of the present invention is slid.

FIG. 4 is a view showing a state in which the covering portion 25 of the assembly tool 2 according to the present embodiment is slid. Specifically, FIG. 4 shows a case where a target for the component assembly process is the connection port 13. The component assembly process is performed sequentially for each connection port. Thus, as shown in FIG. 4, only the covering portion 25 corresponding to the connection port 13 targeted for the assembly process is slidably moved to the left side as viewed in the figure and is arranged at the non-covering position, and the other connection ports 11 to 12, 14 to 16 not targeted for the assembly process are each covered with the covering portions. The process of assembling a component A to the connection port 13 is performed in this state, and therefore, avoiding the possibility of the component dropping into the other connection ports 11 to 12, 14 to 16 not targeted for the assembly process and contaminating these connection ports 11 to 12, 14 to 16.

Figure 5:
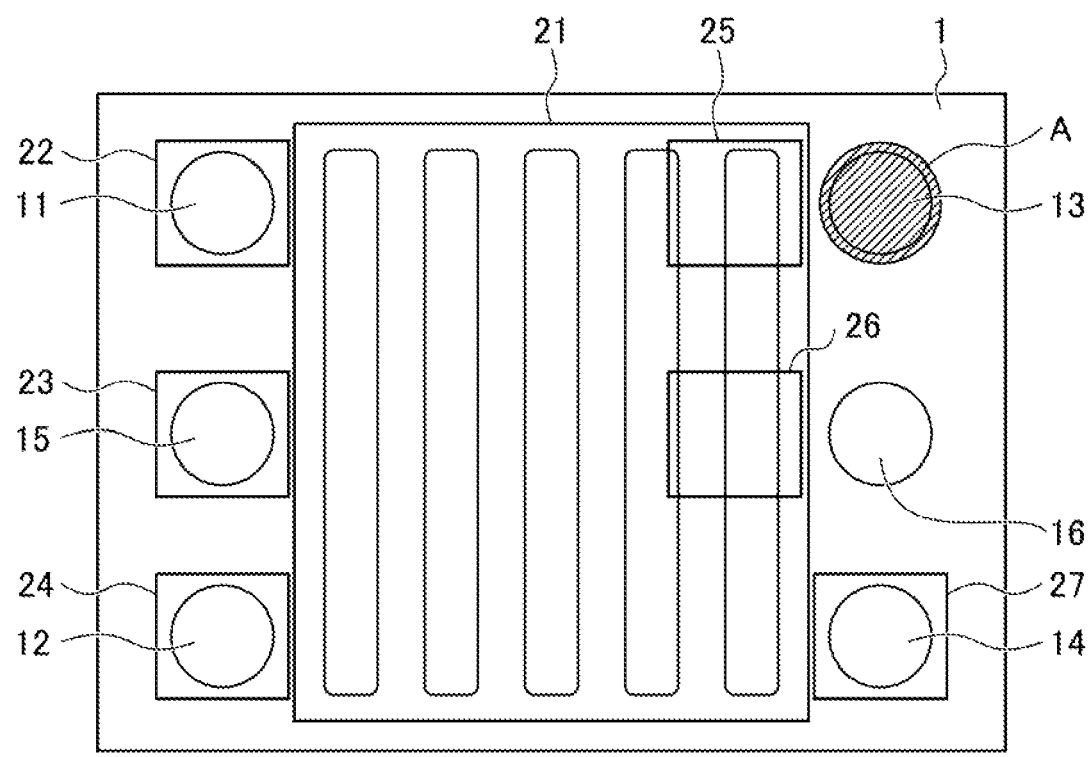
FIG. 5 is a view showing a state in which the covering portion of the assembly tool according to one embodiment of the present invention is slid.

FIG. 5 is a view showing a state in which the covering portion 26 of the assembly tool 2 according to the present embodiment is slid after the process of assembling the corresponding component A to the connection port 13 has been performed. Specifically, FIG. 5 shows a case where the target for the component assembly process is the connection port 16. As shown in FIG. 5, only the covering portion 26 corresponding to the connection port 16 targeted for the assembly process is slidably moved to the left side as viewed in the figure and is arranged at the non-covering position, and the other connection ports 11 to 15 not targeted for the assembly process are each covered with the covering portions. The process of assembling a component to the connection port 16 is performed in this state, and therefore, avoiding the possibility of the component dropping into the other connection ports 11 to 15 not targeted for the assembly process and contaminating these connection ports 11 to 15. Note that the component A is assembled to the connection port 13 in this state, and therefore, the covering portion 25 is immovably fixed by a not-shown lock mechanism at the non-covering position on the base portion 21.

Thus, the method for assembling a component by means of the assembly tool 2 according to the present embodiment includes the step of positioning the base portion 21 on the upper surface of the fuel-cell stack 1, the step of moving at least one of the plurality of covering portions 22 to 27 to the non-covering position and holding the remaining covering portions at the covering positions, and the step of assembling the component to the connection port that becomes accessible by movement to the non-covering position. With this configuration, dust or a small component is prevented from dropping into the connection ports other than the connection port targeted for the operator's assembly process.

The component assembly method according to the present embodiment further preferably has the step of spraying out the purge gas from the connection ports 11 to 16 to which components are to be assembled. Specifically, at this step, the purge gas is introduced from a lower side of the fuel-cell stack 1, i.e., the opposite side of each of the connection ports 11 to 16. With this configuration, the purge gas is sprayed out from each of the connection ports 11 to 16, and therefore, the possibility of the component dropping and contaminating is further reduced.

According to the present embodiment, the following advantageous effects are achieved. The assembly tool prepared to be used for the present embodiment includes the base portion 21 positioned on the upper surface of the fuel-cell stack 1 and the plurality of covering portions 22 to 27 covering the plurality of connection ports 11 to 16, and the plurality of covering portions 22 to 27 is configured such that each of these covering portions 22 to 27 is, relative to the base portion 21, movable between the covering position for covering a corresponding one of the connection ports 11 to 16 and the non-covering position accessible to a corresponding one of the connection ports 11 to 16. With this configuration, when the operator assembles components to the connection ports 11 to 16 of the fuel-cell stack 1, only the covering portion covering the connection port targeted for assembly is moved to the non-covering position. That is, the covering portions covering the other connection ports not targeted for assembly are held at the covering positions, and therefore, the component can be reliably prevented from dropping into the other connection ports not targeted for assembly and contaminating these connection ports.

The assembly method according to the present embodiment includes the step of positioning the base portion 21 on the upper surface of the fuel-cell stack 1, the step of moving at least one of the plurality of covering portions 22 to 27 to the non-covering position and holding the remaining covering portions at the covering positions, and the step of assembling a component to the connection port that becomes accessible by movement to the non-covering position. With this configuration, advantageous effects similar to those of the above-described assembly tool according to the present embodiment are achieved.

The assembly method according to the present embodiment further includes the step of spraying out the purge gas from the connection port to which the component is to be assembled. With this configuration, the purge gas is sprayed out from the connection port targeted for assembly when the component is assembled to such a connection port, and therefore, the possibility of the component dropping into the connection port targeted for assembly and contaminating such a connection port can be reduced.

Note that the present invention is not limited to the above-described embodiment, and changes and modifications made within a scope in which the object of the present invention can be achieved are included in the present invention.

EXPLANATION OF REFERENCE NUMERALS

1 Fuel-Cell Stack
2 Assembly Tool
11 to 16 Connection Port
21 Base Portion
22 to 27 Covering Portion

What is claimed is:

1. An assembly method using an assembly tool including a base portion positioned on an upper surface of a fuel-cell stack and a plurality of covering portions each provided corresponding to a plurality of connection ports provided at the upper surface of the fuel-cell stack and communicating with a plurality of communication holes and each covering the corresponding connection ports, the method comprising:

an assembly tool preparation step of preparing the assembly tool configured such that each of the plurality of covering portions is, relative to the base portion, movable between a covering position for covering the connection port and a non-covering position accessible to the connection port;

a tool positioning step of positioning the base portion of the assembly tool prepared at the assembly tool preparation step on the upper surface of the fuel-cell stack;

a covering portion selective movement step of selectively moving, to the non-covering position, at least one of the plurality of covering portions of the assembly tool positioned at the tool positioning step and holding the remaining covering portions at the covering position; and a component assembly step of assembling a predetermined component to the connection port that becomes accessible by selective movement of the covering portion to the non-covering position at the covering portion selective movement step.

2. The assembly method using the assembly tool according to claim 1, wherein at the assembly tool preparation step, the assembly tool configured such that the plurality of covering portions are plate-shaped members is prepared.

3. The assembly method using the assembly tool according to claim 1, wherein at the assembly tool preparation step, the assembly tool configured such that the base portion and the plurality of covering portions are transparent members is prepared.

4. The assembly method using the assembly tool according to claim 1,
wherein at the assembly tool preparation step, the assembly tool configured such that the base portion has a raised portion to be fitted in a recessed portion of a center portion of the upper surface of the fuel-cell stack is prepared.

5. The assembly method using the assembly tool according to claim 1,
wherein at the assembly tool preparation step, the assembly tool having the plurality of covering portions provided with a plurality of microholes is prepared, the plurality of microholes having a size of equal to or less than an allowable contaminant size and allowing passage of purge gas.

6. The assembly method using the assembly tool according to claim 4,
wherein at the tool positioning step, the assembly tool is positioned in such a manner that the raised portion of the base portion of the assembly tool prepared at the assembly tool preparation step is fitted in the recessed portion of the center portion of the upper surface of the fuel-cell stack.

7. The assembly method using the assembly tool according to claim 1, further comprising:
a purge step of spraying out the purge gas from the connection port to which the component is to be assembled.

8. The assembly method using the assembly tool according to claim 7,
wherein the assembly tool having the plurality of covering portions provided with a plurality of microholes having a size of equal to or less than an allowable contaminant size and allowing passage of purge gas is prepared at the assembly tool preparation step and the purge step is performed in such a manner that the purge gas is sprayed out from the microholes of the covering portions.

* * * * *